(12) United States Patent
Djeu (10) Patent No.: US 7,128,943 B1
(45) Date of Patent: Oct. 31, 2006

(54) METHODS FOR FABRICATING LENSES AT THE END OF OPTICAL FIBERS IN THE FAR FIELD OF THE FIBER APERTURE

(75) Inventor: Nicholas Djeu, Tampa, FL (US)

(73) Assignee: University of South Florida, Tampa, FL (US)

( * ) Notice: Subject to any disclaimer, the term of this patent is extended or adjusted under 35 U.S.C. 154(b) by 144 days.

(21) Appl. No.: 10/369,993

(22) Filed: Feb. 20, 2003

Related U.S. Application Data (60) Provisional application No. 60/358,143, filed on Feb. 20, 2002.

(51) Int. Cl.
*B05D 5/06* (2006.01)

(52) U.S. Cl. ............... 427/162; 427/163.1; 427/163.2; 427/240; 427/512; 427/513; 427/516; 427/508; 118/52; 118/56; 385/33; 385/34; 385/35

(58) Field of Classification Search ............... 427/508, 427/512, 513, 516, 162, 163.1, 163.2, 240; 118/52, 56; 385/33, 34, 35
See application file for complete search history.

(56) References Cited

U.S. PATENT DOCUMENTS

| | | | | |
|---|---|---|---|---|
| 4,269,648 | A | * | 5/1981 | Dakss et al. ............... 156/293 |
| 4,759,596 | A | * | 7/1988 | Po et al. ............... 385/37 |
| 4,867,776 | A | * | 9/1989 | Sharp ............... 65/387 |
| 5,005,320 | A | * | 4/1991 | Furmanak ............... 451/285 |
| 5,073,402 | A | * | 12/1991 | Henderson ............... 427/2.12 |
| 5,169,677 | A | * | 12/1992 | Sangyoji et al. ............... 427/581 |
| 5,317,452 | A | * | 5/1994 | Prentiss et al. ............... 359/819 |
| 5,376,408 | A | * | 12/1994 | Lippert ............... 427/240 |
| 5,384,872 | A | * | 1/1995 | Jacobs-Cook et al. ........ 385/31 |
| 5,498,444 | A | | 3/1996 | Hayes |
| 5,707,684 | A | | 1/1998 | Hayes et al. |
| 6,236,493 | B1 | * | 5/2001 | Schmidt et al. ............. 359/296 |
| 6,378,988 | B1 | | 4/2002 | Taylor et al. |
| 6,856,712 | B1 | * | 2/2005 | Fauver et al. ................ 385/12 |

(Continued)

FOREIGN PATENT DOCUMENTS

EP 0712014 A1 5/1996

OTHER PUBLICATIONS

Saitoh et al., Saitoh, Chalcogenide-glass Microlenses Attached to Optical-fiber End Surfaces; Optics Letters/vol. 25 No. 24/Dec. 15, 2000.

(Continued)

*Primary Examiner*—Alain L. Bashore
(74) *Attorney, Agent, or Firm*—Ronald E. Smith; Smith & Hopen, P.A.

(57) ABSTRACT

A microlens is affixed in the far field of an optical fiber to spatially transform a beam either entering or exiting the fiber. In a first embodiment, a droplet of photo polymer is placed on the end of an optical fiber and the fiber is spun to create an artificial gravity. The droplet is cured by UV radiation during the spinning. In a second embodiment, nanoparticles are mixed into the droplet to increase the refractive index of the photo polymer. A third embodiment employs artificial gravity to attach a microsphere to the end of the optical fiber. A fourth embodiment chemically treats the surface of the microsphere so that the requirement of artificial gravity is either reduced or eliminated. In a fifth embodiment the droplet is cured under equlibrium or non-equilibrium conditions to obtain different final shapes for the lenslet. A sixth embodiment discloses fabrication of microlens arrays.

11 Claims, 3 Drawing Sheets

U.S. PATENT DOCUMENTS

2001/0033712 A1* 10/2001 Cox et al. ............ 385/33
2002/0064341 A1* 5/2002 Fauver et al. .......... 385/25
2002/0097974 A1* 7/2002 Matsumoto et al. ...... 385/137
2003/0081896 A1* 5/2003 Kroupenkine .......... 385/33

OTHER PUBLICATIONS

Cox et al., W.R., Microjetted Lenslet Triplet Fibers; Optics Communications 123 (1996) pp. 492-496; Elsevier Science B.V.; Feb. 1, 1996.

Simple Self-Centring Technique for Mounting Microsphere Coupling Lens on a Fibre, Electronics Letter, Jun. 5, 1980 vol. 16 No. 12.

Microlenses for Coupling Single-Mode Fibers to Single-Mode Thin-Film Waveguides, Optical Society of America, Sep. 1, 1980, vol. 19 No. 17 p. 2906-2909.

L.G. Cohen et al., Microlenses for Coupling Junction Lasers to Optical Fibers, Optical Society of America, Jan. 1974, vol. 13 No. 1 p. 89-94.

W.R. Cox et al., Microjetted Lenslet Triplet Fibers, Elsevier Science B.V., 1996.

G. Eisenstein et al., Chemically Etched Conical Microlenses for Coupling Single-Mode Lasers into Single-Mode Fibers, Optical Society of America, Oct. 1, 1982, vol. 21 No. p. 3470-3474.

H. Ghafoori-Shiraz et al., Microlens for Coupling a Semiconductor Laser to a Single-Mode Fiber, Optical Society of America, Aug. 1, 1986, vol. 11 No. 8 p. 537-539.

Improved Coupling Between Laser Diode and Single-Mode Fibre Tipped with a Chemically Etched Self-Centred Diffracting Element, The Institution of Electrical Engineers, Jun. 11, 1981, vol. 17, No. 12 p. 400-402.

H. Kuwahara et al., Efficient Coupling from Semiconductor Lasers into Single-Mode Fibers with Tapered Hemispherical Ends, Optical Society of America Aug. 1, 1980, vol. 19 No. 15 p. 2578-2583.

Kyung S. Lee et al., Microlenses on the End of Single-Mode Optical Fibers for Laser Applications, Optical Society of America, Oct. 1, 1985, vol. 24 No. 19 p. 3134-3139.

Saitoh et al., Chalcogenide-glass Microlenses Attached to Optical-Fiber End Surfaces, Optical Society of America, Dec. 15, 2000, vol. 25 No. 24.

E. Weidel, Light Coupling from a Junction Laser into a Monomode Fibre with a Glass Cylindrical Lens on the Fibre End, Elsevier Science Publishers, Sep. 1974, vol. 12 No. 1 p. 93-97.

Yamada et al., Characteristics of a Hemispherical Microlens for Coupling Between a Semiconductor Laser and Single-mode Fiber, IEEE J. Quant. Electron, Oct. 1980 vol. QE-16 No. 10 p. 1067-1072.

* cited by examiner

METHODS FOR FABRICATING LENSES AT THE END OF OPTICAL FIBERS IN THE FAR FIELD OF THE FIBER APERTURE

CROSS REFERENCE TO RELATED APPLICATION

This disclosure is a continuation-in-part of a co-pending disclosure of the same title by the same inventor, filed Feb. 20, 2002, bearing Ser. No. 60/358,143.

BACKGROUND OF THE INVENTION

1. Field of the Invention

This invention relates, generally, to the fabrication of microlenses attached to the end of optical fibers or small cylindrical rods in general. The purpose of the microlens is to focus light entering or leaving the fiber or mini-rod.

2. Description of the Prior Art

Lenses are used in fiber optics for coupling a signal propagating through an optical fiber into preselected photonic components. An optical beam exiting a fiber must be focused or collimated to facilitate its coupling to a preselected photonic component.

External lenses, one of which is known as the GRIN lens, are in current use.

Attempts, with varying degrees of success, have been made to improve upon such external lenses by positioning a lensing element at the distal end of the fiber, in the near field of the fiber aperture. However such a lens, at best, can only focus the output beam. Moreover, such lenses would be expensive to produce on a commercial scale.

One prior art lens provides a non-focusing lens in the far field; the divergence of the beam is merely reduced.

What is needed, then, is an inexpensive means for better focusing or collimating a light beam exiting an optical fiber. More particularly, a focusing lenslet is needed at the distal end of an optical fiber in the far field of the fiber aperture.

However, in view of the prior art considered as a whole at the time the present invention was made, it was not obvious to those of ordinary skill in the pertinent art how the identified need could be fulfilled.

SUMMARY OF THE INVENTION

The long-standing but heretofore unfulfilled need for a method for fabricating lenses at the end of optical fibers in the far field of the fiber aperture is now met by a new, useful, and nonobvious method that includes the steps of selecting a lens material from a group of lens materials having a large refractive index, high transparency, low shrinkage upon curing, good thermal stability, and ease of curing while centrifuged. A droplet of said lens material is applied to a preselected end of the optical fiber, followed by application of a predetermined artificial gravitational acceleration by spinning the optical fiber and droplet in a centrifuge. The lens material is cured by a suitable means as the optical fiber is spinning.

In a second embodiment, nanoparticles of a preselected transparent material having a high refractive index are incorporated into the lens material, thereby creating a composite lens material having an increased refractive index and providing a gradient in the refractive index to enhance the focusing capability of the composite lens material. The nanoparticles are incorporated into the lens material prior to the application of artificial gravity.

In a third embodiment, a microsphere is introduced into the lens material prior to application of the artificial gravitational acceleration.

The novel method of attaching a microsphere to a preselected end of an optical fiber at a preselected distance from said preselected end includes the steps of selecting an optical cement having a preselected surface tension and a preselected density. A microsphere having a density greater than the preselected density of the optical cement is then selected. A droplet of the optical cement is applied to the preselected end of the optical fiber and the optical fiber is positioned in a vertical plane so that the optical cement depends from a lowermost end of the optical fiber and a microsphere is introduced into the optical cement. At least a portion of the microsphere but less than a hemisphere of the microsphere protrudes from the optical cement. The optical fiber and droplet are then mounted on a rotatable disc and an artificial gravitational acceleration is applied to the optical fiber and droplet along a longitudinal axis of symmetry of the optical fiber by spinning the disc about its rotational axis with the droplet positioned radially outward of the optical fiber. The optical cement is cured while the disc is spinning. In this way, the microsphere is attached to the preselected end of the optical fiber at a preselected distance from said preselected end.

A top wall of the disc has a predetermined slope so that a center of the disc is elevated with respect to the peripheral edge of the disc. The predetermined slope is an angle equal to the arctan of the ratio of the gravitational acceleration of earth to the artificial gravitational acceleration produced by the spinning.

In a fourth embodiment, the surface of the microsphere is chemically treated to produce a preselected contact angle with respect to the optical cement so that the step of applying the artificial gravitational acceleration is eliminated.

A fifth embodiment includes a method for fabrication of lenslets in artificial gravity under nonequilibrium conditions. A droplet is deposited on an optical fiber and may be partially cured prior to spinning said droplet to increase the starting viscosity of the droplet to a predetermined high value.

More particularly, the droplet is spun for a predetermined amount of time with a predetermined time profile of the rotational speed. The time required for the droplet to change its shape noticeably at any moment during its evolution history from rest to a predetermined terminal rotational speed is long compared to its curing time. Moreover, the shape of the droplet is determined by the predetermined amount of time and the predetermined time profile of the rotational speed.

In a first example of the fifth embodiment, a weak UV curing source is employed so that the curing time of the droplet is comparable to the total spin time. The viscosity and surface tension coefficient of the droplet varies with time as curing proceeds. The evolution of the droplet ceases when a sufficiently high viscosity is reached. The use of a weak UV curing source provides lenslet shapes that are different from those obtainable with a strong UV curing source.

In a second example of the fifth embodiment, the intensity of the weak UV curing source is varied with time. In a third example, the weak radiation is followed by a short intense pulse to instantaneously solidify the photopolymer at a preselected droplet shape. This provides still further lenslet shapes not otherwise obtainable.

Microlens arrays are fabricated in a sixth embodiment. A previously-treated substrate is selected to produce an array of circular mesas and a plurality of photopolymer droplets is applied to the top of each circular mesa. The droplets are subjected to artificial gravity and cured by UV radiation under equilibrium or non-equilibrium conditions.

A novel method for forming an array of microlenses under artificial gravity includes the steps of providing a substrate having a plurality of circular mesas formed therein and depositing a photopolymer droplet upon each of the mesas. A rotationally-mounted disc is adapted for rotation about a central axis of rotation. The disc includes a top wall having a first predetermined diameter, a bottom wall having a second predetermined diameter less than the first predetermined diameter, and a sidewall interconnecting the top and bottom walls to one another. The sidewall presents a wedge-shaped profile when viewed in side elevation. An angle α is defined as the angle between the plane of the top wall and the plane of the sidewall.

A substrate is attached to the sidewall and each substrate is covered with a housing that includes a UV-transparent window means formed therein. The disc is positioned within a rotor housing that is concentrically mounted with respect to the central axis of rotation of the disc. A plurality of UV light sources is positioned in circumferential spacing around an inside wall of the rotor housing so that a uniform light intensity impinges upon each photopolymer droplet regardless of its instantaneous position. The disc is rotated about the central axis with a predetermined time profile of the rotational speed for a predetermined amount of time.

When the photopolymer droplet is subjected to equilibrium curing, the sidewall is angled relative to a plane perpendicular to the central axis of rotation at an angle the tangent of which is determined by the ratio of the artificial gravitational acceleration created by the rotation of the disc at the terminal rotational speed of the disc to the earth's gravitational acceleration.

When the photopolymer droplet is subjected to non-equilibrium curing, the sidewall is angled relative to a plane perpendicular to the central axis of rotation at an angle the tangent of which is determined by the ratio of the artificial gravitational acceleration created by said rotation of the disc at the terminal rotational speed of the disc, the artificial gravitational acceleration corresponding to a rotational speed at which curing is essentially complete, to the earth's gravitational acceleration.

The novel apparatus for forming an array of microlenses under artificial gravity includes a substrate having a plurality of circular mesas formed therein. A photopolymer droplet is deposited atop each of said circular mesas. The novel apparatus further includes a rotatably mounted disc adapted for rotation about a central axis of rotation. The disc has a top wall of first predetermined diameter, a bottom wall of second predetermined diameter less than the first predetermined diameter, and a sidewall interconnecting the top and bottom walls to one another. The sidewall presents a wedge-shaped profile when viewed in side elevation. A substrate is attached to the sidewall. A rotor housing is mounted concentrically with respect to the central axis of rotation of the disc. A plurality of UV light sources are positioned in circumferential spacing around an inside wall of the rotor housing so that a uniform light intensity impinges upon each photopolymer droplet regardless of its instantaneous position.

No housing and hence no window means formed therein is required when a vacuum is provided between the inside wall of the rotor housing and the sidewall of the disc. The disc is rotated about the central axis with a predetermined time profile of the rotational speed for a predetermined amount of time.

An important object of this invention is to provide reliable methods for attaching a microlens to an optical fiber in the far field of the optical fiber.

A more specific object is to advance the art of optical fiber microlenses by disclosing a method for forming a microlens by attaching a droplet of a suitable lens material to an optical fiber and spinning the optical fiber and droplet in a centrifuge.

Additional important object includes advancing the art by incorporating nanoparticles into the lens material prior to the application of artificial gravity.

Still another object is to provide a method for incorporating a microsphere into the lens material at a distance from the optical fiber with the application of artificial gravity.

Yet another object is to provide a method for incorporating a microsphere into the lens material and forming a microlens without subjecting the optical fiber and lens material to artificial gravity.

Another object is to provide a method for fabrication of lenslets in artificial gravity under nonequilibrium conditions.

Another object is to provide a method for forming an array of microlenses under artificial gravity.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

In a first embodiment, the lens material is a droplet of photopolymer, thermoplastic, sol-gel, or the like and is applied to a preselected end of a rod or fiber. The lens material is selected from the group of suitable lens materials having a large refractive index, high transparency, low shrinkage upon curing, good thermal stability, and ease of curing while centrifuged. The optical fiber is cleaved at a preselected end and the coating of optical fiber is removed with a stripping agent. The droplet is applied at the cleaved end and the optical fiber and droplet are placed in an artificial gravitational acceleration.

The shape of the liquid drop is found from Laplace's formula:

$$\frac{1}{R_1} + \frac{1}{R_2} + \frac{g\rho y}{\alpha} = const. \quad \text{(equation 1)}$$

where $R_1$ and $R_2$ are the principal radii of curvature, g is gravitational acceleration, $\rho$ is the density of the liquid, and $\alpha$ is the surface tension coefficient for the liquid. When the capillary constant $$a = \sqrt{\frac{2a}{g\rho}}$$

is much larger than the dimensions of the drop, the last term on the left may be ignored. This holds for rods having a diameter of about 100μ at the surface of the earth. The shape of the solid lens will be the same as that of the liquid if negligible shrinkage occurs upon solidification.

Figure 1:
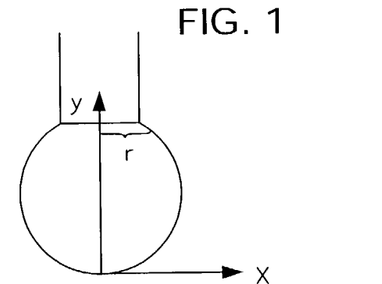
FIG. 1 is a diagrammatic view of a drop of liquid depending from an optical fiber.

With the coordinates as depicted in FIG. 1, equation (1) becomes $$\frac{y''}{(1+(y')^2)^{\frac{3}{2}}} + \frac{y'}{x(1+(y')^2)^{\frac{1}{2}}} = \frac{2}{R_0} \quad \text{(equation 2)}$$

Where $R_0$ is the radius of curvature at x=0.
The solution to equation 2 is $$y = R_0 - \sqrt{R_0^2 - x^2} \quad \text{(equation 3)}$$

It is seen that when gravity is ignored, the drop is a sphere having a flattened top.

Figure 2:
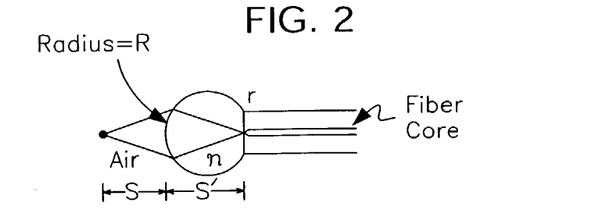
FIG. 2 is a diagrammatic view depicting the focusing of a thick lens.

The focusing by a thick lens as shown in FIG. 2 is given by:

$$\frac{1}{S} + \frac{n}{S'} = \frac{n-1}{R} \quad \text{(equation 4)}$$

To achieve large focusing power (for a given n), R must be made small and S' large. The largest S'/S is achieved for S'>>r, in which case:

$$S'/S \cong n-2 \quad \text{(equation 5)}$$

For a given S', R can be made smaller by applying an artificial gravitational acceleration, (through spinning, e.g.) to increase g and hence decrease a. For a comparable to r, the shapes of the droplets have been given by Freud & Hawkins in the Journal of Physical Chemistry, volume 33, page 1217 (1929). For r/a=0.6 and S'/a=1.6, e.g., R/a=0.6. From equation (4), S=S' for n=2.2. In contrast, the best focusing power without artificial gravity would be S'/S=0.2 for the same n from equation (5). For r=120μ, a=0.2 mm. This corresponds to g=200 $g_0$, and can readily be achieved by spinning.

Figure 3:
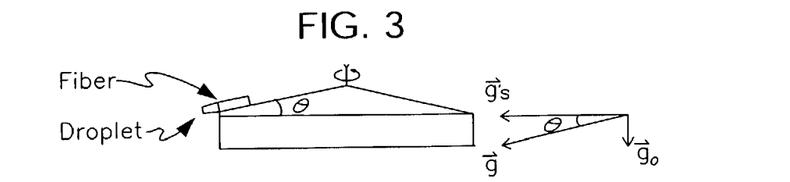
FIG. 3 is a side elevational, diagrammatic view of a spinning platform.

As depicted in FIG. 3, a platform is mounted for rotation about a vertical axis. The optical fiber is aligned in radial relation to the axis of rotation with the droplet positioned radially outwardly of the optical fiber. The optical fiber is positioned so that the droplet and a predetermined extent of the optical fiber overhang a peripheral edge of the platform. A top wall of the platform is sloped at a predetermined slope so that a center of the platform is elevated with respect to the peripheral edge of the platform. The predetermined slope is an angle equal to the arctan of the ratio of the gravitational acceleration of earth to the artificial gravitational acceleration produced by the spinning. More precisely, the angle θ should be made to be equal to tan $$-1\left(\frac{g_o}{g_s}\right)$$

where $g_s$ is the artificial gravitational acceleration produced by spinning.

The polymer-tipped rod or fiber is placed inside a small glass tube to shield the droplet from the deleterious effects of air currents as the platform is spun about its axis of rotation. When the droplet has reached equilibrium, a curing/drying source such as a UV lamp is turned on. To achieve uniformity of curing, a polished aluminum platform is used to reflect the UV radiation so that the top and bottom sides of the droplet receive approximately equal irradiation. This prevents hardening of one part of the lenslet prior to hardening of another part and thus reduces unwanted distortion.

The spinning has the effect of elongating the droplet and making it more pointed. The result is a microlens in the far field that overcomes the limitations of microlenses heretofore known.

Figure 4:
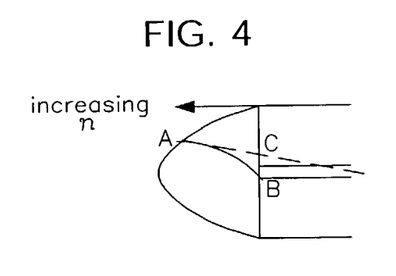
FIG. 4 is a diagrammatic view of a microlens with a graded refractive index.

In a second embodiment of the invention, the refractive index of the polymer or sol-gel is increased by mixing in high refractive index nanoparticles formed of a transparent material such as $Ti_2O_3$. This also enables producing a microlens with a graded refractive index along the optical axis through centrifugation as depicted in FIG. 4.

Solid line AB indicates a bent ray as a result of the graded index, and dashed line AC is a straight line the ray would follow without the gradient.

Positioning of Microsphere at End of Optical Fiber by Artificial Gravity

In a third embodiment, a microsphere is attached to the end of an optical fiber by using an optical cement for the purpose of focusing the light coming out of the fiber. The focusing properties of the microsphere depend on the thickness of the cement in between. The novel technique of this invention allows the controlled positioning of the microsphere by applying an artificial gravitational acceleration to the fiber/microsphere assembly before the cement is cured.

Figures 5, 6B:
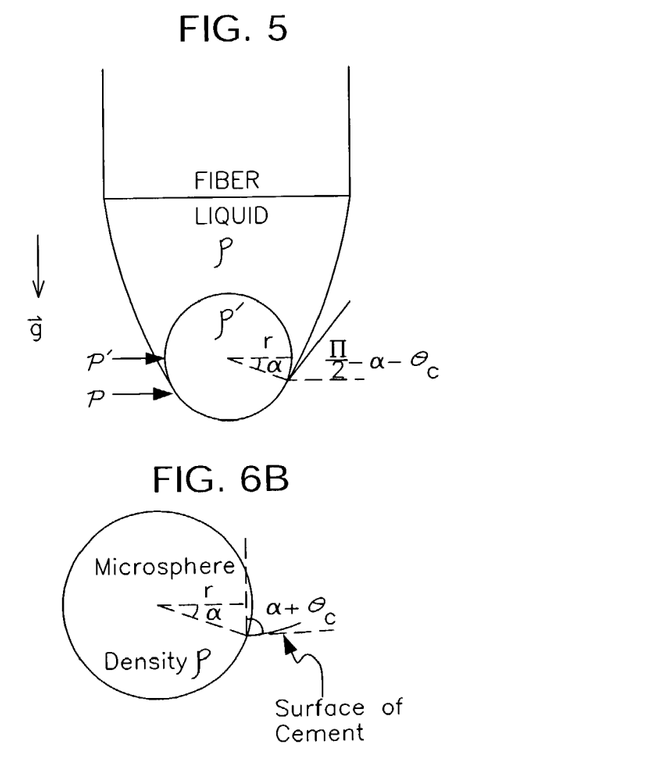
FIG. 5 is a diagrammatic view of a liquid droplet containing a microsphere depending from a fiber.
FIG. 6B is an enlarged view of the microsphere depicted in FIG. 6A.

When a fiber tipped with a liquid containing a microsphere is held vertically with the droplet hanging at the bottom, the microsphere protrudes out of the liquid if it has a density greater than that of the liquid, as depicted in FIG.

5. The extent of protrusion depends upon its size and its surface interaction with the liquid, the radius of the fiber, the surface tension of the liquid, etc.

By balancing the "weight" of the microsphere with the buoyant force of the liquid and the atmosphere outside, to have the solid/liquid/gas intersection make an angle α with the "horizontal" (FIG. 5), the artificial gravitational acceleration needed is given by:

$$g = \frac{6\gamma \cos\alpha \cos(\alpha + \theta_c) - 3r\Delta P(1 - \sin^2\alpha)}{4r^2\rho' - r^2\rho(2 + 3\sin\alpha - \sin^3\alpha)}$$

where γ is the surface tension of the liquid. $\theta_c$ is the contact angle of the liquid on the microsphere, r is the radius of the microsphere, ρ and ρ' are the densities of the liquid and the microsphere, and Δp is the difference in pressure between the liquid at the bottom and the outside atmosphere (p–p in FIG. 5).

For α=0, γ=40 dynes/cm, $\theta_c$=30°, r=30μ, ΔP=γ/r, ρ=1.2 g/cm³, and ρ'=4 g/cm³, g=700 $g_o$ where $g_o$ is the earth's gravitational acceleration. The volume of the liquid determines the gap between the microsphere and the end of the fiber.

The artificial gravity is created by placing the fiber on a rotating disk, with the fiber end pointing outwards. The microsphere is fixed in place by applying UV/heat to cure the optical cement while the fiber is spun at the desired rotational speed. To correct for earth's gravity which will introduce some amount of asymmetry, the disc can be made to have a slightly conical cross-sectional profile with a cone angle of $\tan^{-1}(g/g_o)$.

Distancing Microsphere from End of Optical Fiber by Controlling Contact Angle

Figure 6A:
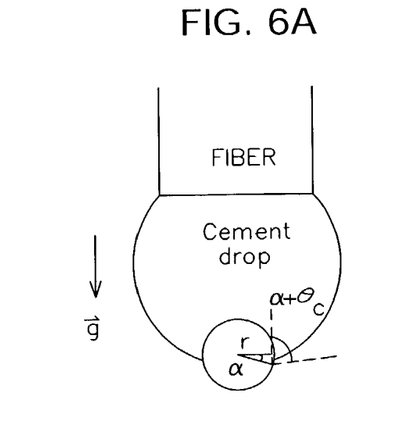
FIG. 6A is diagrammatic view of a liquid cement droplet containing a microsphere depending from a fiber.

In a fourth embodiment, a microsphere is attached to the end of an optical fiber at a distance from the fiber end if a suitable contact angle between the optical cement and the microsphere is selected as depicted in FIGS. 6A and 6B.

For a cement drop >100 μm, forces due to liquid and air pressure can be ignored. Accordingly, $$2\pi r\gamma \cos\alpha \cos(\alpha + \theta_c) \cong \frac{4}{3}\pi r^3 \rho g$$

where γ is the surface tension of the cement and $\theta_c$ the contact angle between the cement and the microsphere. For r<50μ and typical values of γ and ρ, the equation is satisfied for $$\alpha + \theta_c \cong \frac{\pi}{2}.$$

For small α, $\theta_c$ must be close to ninety degrees (90°), i.e., the cement must wet the microsphere only slightly. When the microsphere is captured by the cement by contact, the fiber is held vertically as shown and cement UV/heat cured. If the contact angle between the selected cement and the native surface of the sphere is not close to 90° to begin with, the latter can be treated chemically to produce decreased wetting. This method can either reduce or eliminate the need to apply artificial gravity.

Fabrication of Lenslets in Artificial Gravity Under Nonequilibrium Conditions

In the above embodiments, curing of the droplet which is to become the lenslet is initiated when the artificial gravity generated by spinning has reached a constant value and the droplet has had time to adjust to an equilibrium shape. Under these conditions the shape of the lenslet for a given base diameter and volume is completely determined by its density, surface tension, and the magnitude of the artificial gravitational field. More precisely, where:

ρ=density of the liquid;
α=surface tension coefficient of liquid; and
g=artificial gravitational acceleration;

then the crucial parameter is the capillary constant defined by $$a = \sqrt{\frac{2\alpha}{g\rho}}$$

When equilibrium has been reached at a given artificial gravitational acceleration, i.e., when all flowing of the droplet has ceased, the final shape of the droplet is uniquely determined by its base diameter, its volume (or height), and the capillary constant α.

In this fifth embodiment the droplet is cured under non-equilibrium conditions to obtain different final shapes for the lenslet. A hyperbolic shape is especially desirable because it provides distortionless focusing for a collimated incident beam. In the following examples, the starting liquid is a photopolymer and the curing agent is ultraviolet light, although other possibilities also exist (e.g., thermoplastic with heat curing).

In a first example of the fifth embodiment, a droplet is deposited on an optical fiber and may be partially cured before it is spun. This increases the starting viscosity of the droplet to a sufficiently high value so that the time required for the droplet to change its shape noticeably at any moment during its evolution history from rest to a predetermined terminal rotational speed is long compared to its curing time. Accordingly, it becomes possible to obtain any of the intermediate shapes between the two times. The sequence of intermediate shapes itself depends on the predetermined time profile of the rotational speed.

In a second example of the fifth embodiment, a weak UV curing source is used so that the curing time is comparable to the total spin time. Thus, the viscosity and surface tension coefficient of the photopolymer varies with time in addition to the rotational speed. The evolution of the droplet ceases when a sufficiently high viscosity is reached. Lenslet shapes different from those obtainable with the first example of this fifth embodiment can be provided when the steps of this second example are followed.

In a third example of the fifth embodiment, the second method is modified by programming the intensity of the weak UV curing source to vary with time. In particular, the weak radiation may be followed at the end by a short intense pulse to instantaneously solidify the photopolymer at some desired droplet shape. This third example of the fifth embodiment thus produces lenslet shapes not possible with the first examples.

In view of this disclosure, it is now obvious to those of ordinary skill in this art that other variations are possible to produce lens-tipped optical fibers in artificial gravity under nonequilibrium conditions.

Figure 7A:
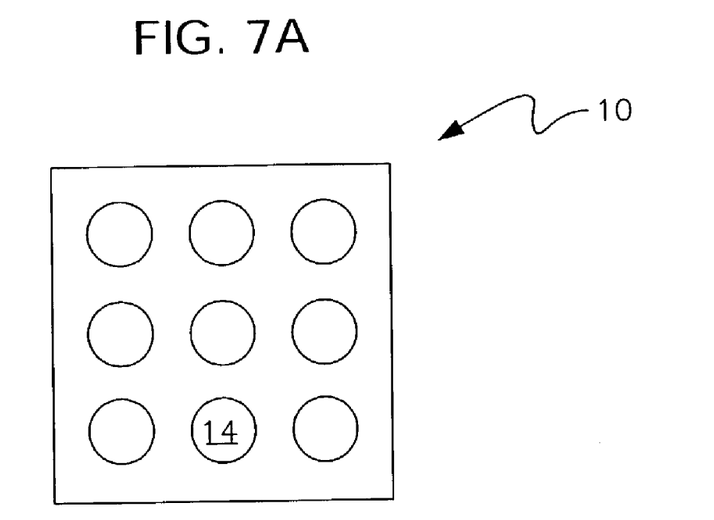
FIG. 7A is a top plan view of a substrate having an array of circular mesas.
Figure 7B:
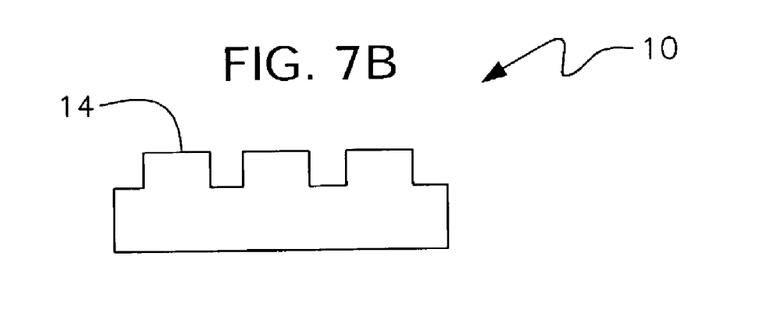
FIG. 7B is a side elevational view thereof.

In a sixth embodiment, the same basic principles are applied to the fabrication of microlens arrays. The process begins by selecting a substrate that has been treated previously (e.g., lithographically) to produce an array of circular mesas. FIGS. 7A and 7B provide top and side views, respectively, of such a substrate, denoted 10 as a whole. Droplets of photopolymer 12 (FIG. 7C) are applied to the top of mesas 14 by microjetting or other suitable means.

Figure 7C:
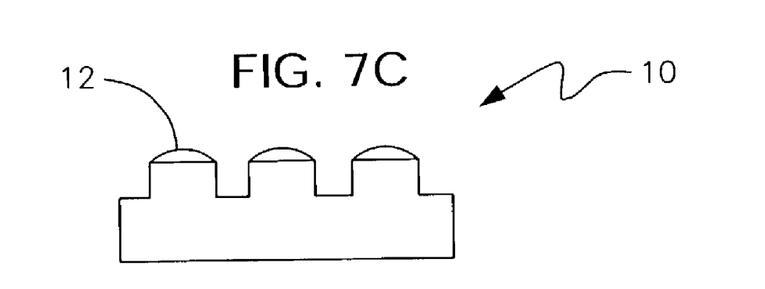
FIG. 7C is a side elevational view of said substrate after droplets of a photopolymer are applied to the top of said mesas.

The shape of each droplet 12 will always be spherical in normal gravity for mesa diameters of less than approximately one millimeter (1 mm), regardless of the orientation of substrate 10. When used to focus a beam of light, such a shape will lead to spherical aberration, especially when the thickness of the lens is a substantial fraction of its diameter at the base and the light beam fills a large portion of the available aperture. This aberration is reduced by subjecting droplets 12 to artificial gravity prior to curing by UV radiation under either equilibrium or non-equilibrium conditions.

Figures 8, 8A:
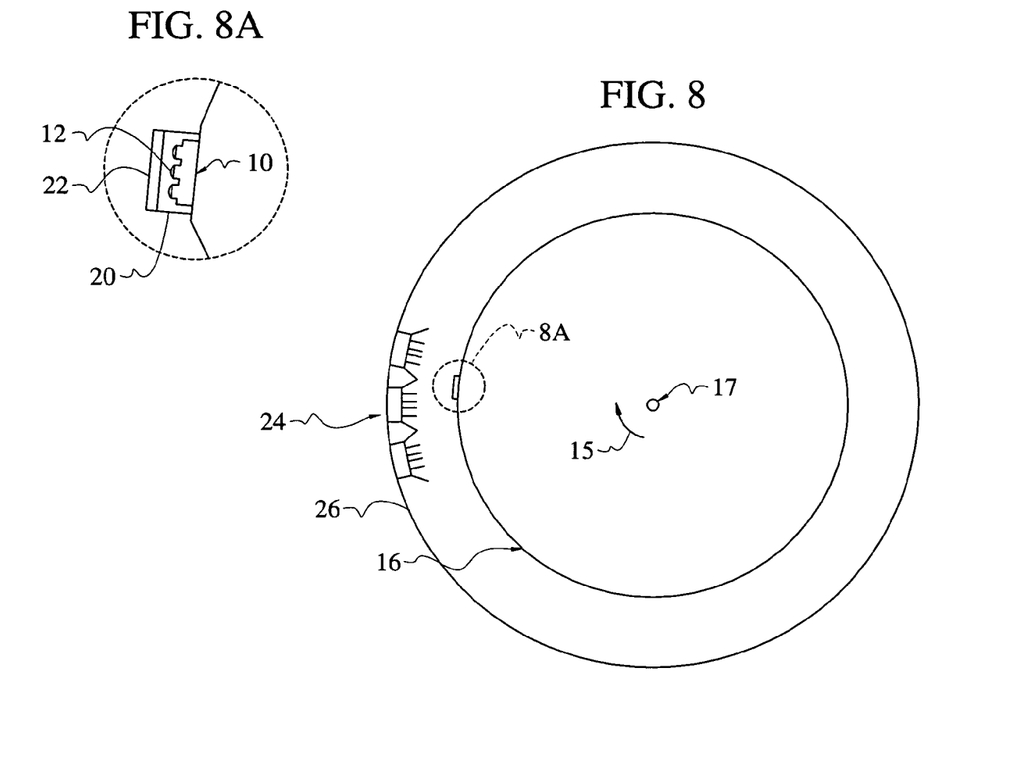
FIG. 8 is a top plan view of an apparatus for forming a microlens array.
FIG. 8A is an enlarged, detailed view of the circled area denoted 8A in FIG. 8.
Figure 9:
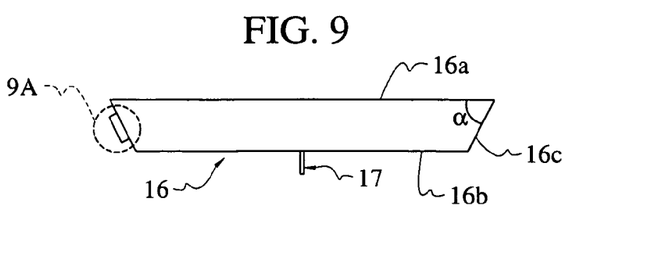
FIG. 9 is a side elevational view of a spinning disc that forms a part of the apparatus for making a microlens array.
Figure 9A:
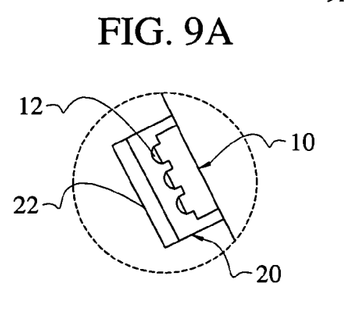
FIG. 9A is an enlarged, detailed view of the circled area denoted 9A in FIG. 9.

A preferred embodiment of an apparatus that forms an array of microlenses under artificial gravity is depicted in FIGS. 8, 8A, 9, and 9A. Substrates 10 with photopolymer droplets 12 are attached to spinning disk 16 which is mounted for rotation as indicated by directional arrow 15 about axis 17. Disc 16 is a many sided polygon with a wedged side as seen in side elevation or cross section, as shown in FIG. 9.

More particularly, disc 16 includes top wall 16a of first predetermined diameter, bottom wall 16b of second predetermined diameter less than said first predetermined diameter, and sidewall 16c interconnecting said top and bottom walls to one another, said sidewall presenting a wedge-shaped profile when viewed in side elevation.

The wedge-shaped side eliminates the effect of the earth's gravitational field. As indicated in the detailed views of FIGS. 8A and 9A, each substrate 10 is covered by a housing 20 which is fitted with a window 22 transparent to the UV radiation required for curing. Housing 20 eliminates any deleterious effect that might be caused by air turbulence during spinning. As depicted in FIG. 8, a plurality of UV light sources 24 are circumferentially arranged around the inside of rotor housing 26 in such a way that each array sees essentially a uniform light intensity regardless of its instantaneous position. Array housings 20 can be eliminated if a vacuum is provided in the space in which the arrays are spun.

In the case of equilibrium curing, wedge angle α (FIG. 9) should be made $$\alpha = \tan^{-1}\left(\frac{g}{g_0}\right)$$

where $g_o$ is Earth's gravitational acceleration and g is the artificial gravitational acceleration at the terminal rotational speed. In the case of non-equilibrium curing, g should correspond to the rotational speed at which curing is essentially complete.

It will thus be seen that the objects set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

Now that the invention has been described.

What is claimed is:

1. A method for fabricating a lens at the end of an optical fiber in the far field of the fiber aperture, comprising the steps of:

providing a platform mounted for rotation about a vertical axis;

aligning said optical fiber in radial relation to said vertical axis;

sloping a top of said platform at a predetermined slope so that a center of the platform is elevated with respect to a peripheral edge of said platform;

applying a droplet of a curable liquid lens material to a radially outermost end of said optical fiber;

applying a predetermined range of artificial gravitational acceleration by spinning the platform in a centrifuge; and curing the lens material under nonequilibrium conditions while the optical fiber and droplet are spinning in said centrifuge.

2. The method of claim 1, further comprising the step of selecting a photopolymer lens material.

3. The method of claim 1, wherein the step of applying a droplet of lens material to the radially outermost end of said optical fiber includes the steps of removing the coating of an optical fiber with a stripping agent, cleaving said optical fiber to form a cleaved end, and applying said droplet at said cleaved end.

4. The method of claim 1, wherein said predetermined slope is an angle equal to the arctan of the ratio of the gravitational acceleration of earth to the artificial gravitational acceleration produced by said spinning.

5. The method of claim 1, further comprising the step of placing said radially outermost end of the optical fiber having said droplet thereon inside an enclosure to shield the droplet from the deleterious effects of air currents as the platform is spun about said vertical axis.

6. The method of claim 1, wherein the step of curing said lens material includes the step of providing a source of ultraviolet radiation and activating said source while said optical fiber and droplet of lens material are spinning.

7. The method of claim 6, further comprising the step of providing a polished, reflective platform to reflect said ultraviolet radiation so that the top and bottom sides of the droplet receive approximately equal irradiation to thereby achieve uniformity of curing, and to prevent hardening of one part of the droplet prior to hardening of another part, thereby reducing distortion.

8. A method of attaching a microsphere to a preselected end of an optical fiber at a preselected distance from said preselected end, comprising the steps of:

selecting an optical cement having a preselected surface tension and a preselected density;

selecting a microsphere having a density greater than said preselected density of said optical cement;

applying a droplet of said optical cement to said preselected end of said optical fiber;

introducing said microsphere into said optical cement so that at least a portion of said microsphere but less tan a hemisphere of said microsphere protrudes from said optical cement;

mounting said optical fiber and droplet containing said microsphere on a rotatable disc;

applying an artificial gravitational acceleration to said optical fiber and droplet along a longitudinal axis of symmetry of said optical fiber by spinning said disc about said rotational axis with the droplet positioned radially outward of the optical fiber; and curing said optical cement while said disc is spinning;

whereby said microsphere is attached to said preselected end of said optical fiber at a preselected distance from said preselected end.

9. The method of claim 8, further comprising the step of sloping a top wall of said disc at a predetermined slope so that a center of the disc is elevated with respect to a peripheral edge of said disc.

10. The method of claim 9, wherein said predetermined slope is an angle equal to the arctan of the ratio of the gravitational acceleration of earth to the artificial gravitational acceleration produced by said spinning.

11. The method of claim 8, further comprising the step of chemically treating the surface of the microsphere to produce a preselected contact angle with respect to said optical cement.

* * * * *